H. T. DURANT, H. L. SULMAN & W. HOMMEL.
WET PROCESS FOR THE TREATMENT OF ORES.
APPLICATION FILED NOV. 11, 1909.
966,389.
Patented Aug. 2, 1910.
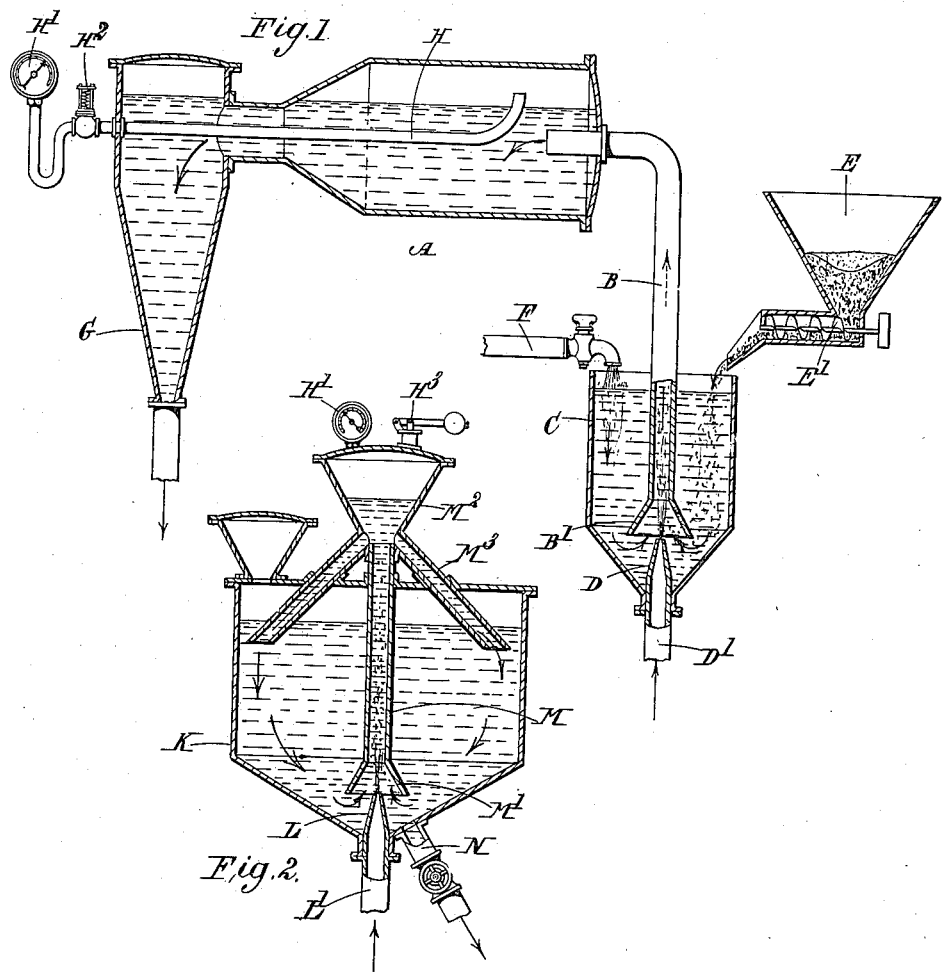

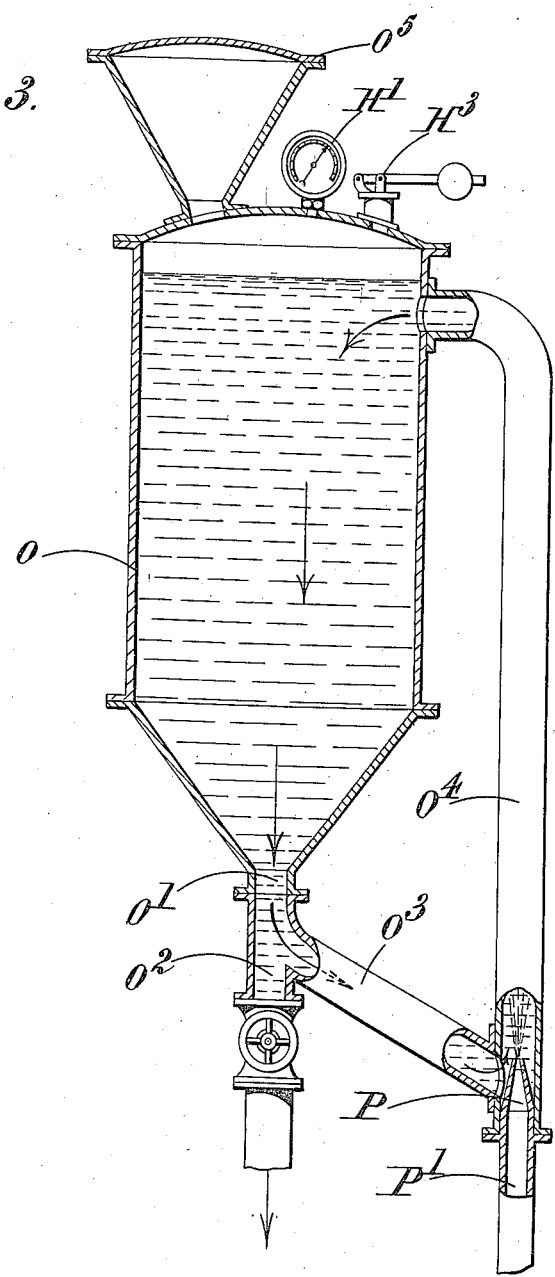

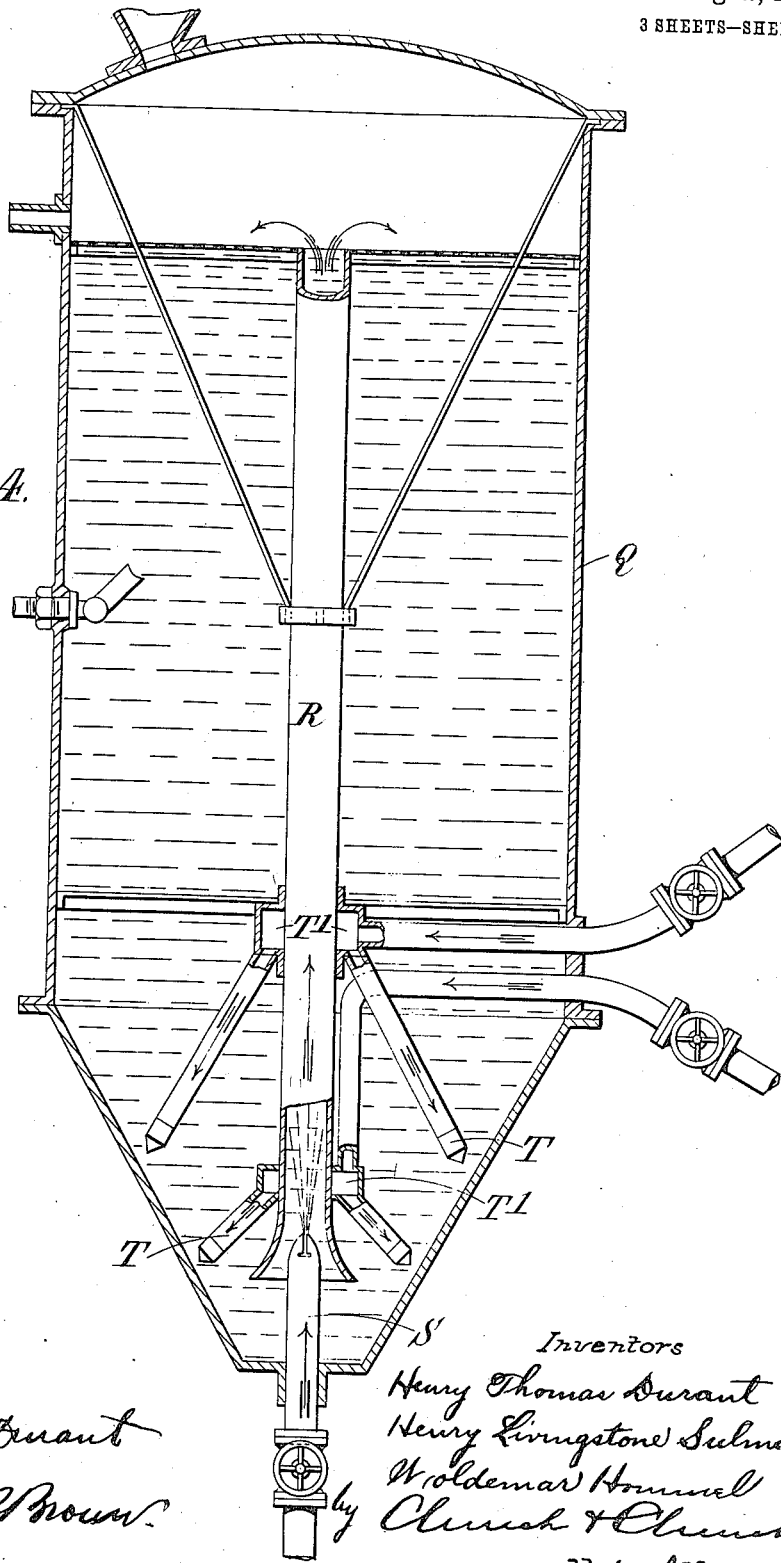

UNITED STATES PATENT OFFICE.

HENRY THOMAS DURANT, HENRY LIVINGSTONE SULMAN, AND WOLDEMAR HOMMEL, OF LONDON, ENGLAND.

WET PROCESS FOR THE TREATMENT OF ORES.

966,389.  Specification of Letters Patent.  Patented Aug. 2, 1910.

Application filed November 11, 1909. Serial No. 527,433.

*To all whom it may concern:*

Be it known that we, HENRY THOMAS DURANT, HENRY LIVINGSTONE SULMAN, and WOLDEMAR HOMMEL, Ph. D., all subjects of the King of England, residing at London, in England, have invented certain new and useful Improvements in Wet Processes for the Treatment of Ores, of which the following is a specification.

This invention relates to wet processes for the treatment of metalliferous ores or compounds particularly of zinc, and more particularly to processes in which ores containing zinc oxid are treated with a solution of sulfurous acid so as to obtain a solution of bisulfite of zinc.

An important feature of this invention is that the solution process is a continuous one.

Hitherto it has been proposed to effect the agitation of the ore or compound with water or other liquid in an apparatus comprising a tank having a pipe open at both ends and arranged vertically therein, and means for introducing at the foot of the pipe a lifting medium such as compressed air for raising the liquid contents of the tank up through the aforesaid pipe thereby promoting a circulation of the said contents. Apparatus of the general type in which a jet or injector is used to cause circulation of a mixture of ore and liquid will be hereinafter referred to as an injector agitator.

According to this invention an injector agitator is supplied with a medium which does not merely promote circulation of the contents of the apparatus but has a chemical effect upon the said contents. The aforesaid medium may be in the form of a soluble gas in which case it will become absorbed by the liquid in the agitating apparatus or it may be already in solution when introduced. For example, when treating zinc ores suspended in water with sulfur dioxid, the sulfur dioxid derived from the roasting of the sulfid ore or otherwise may be introduced directly at the foot of the vertical pipe in the injector agitator containing the roasted ore in suspension in water; or the gas may be first absorbed by water and the dilute sulfurous acid solution so obtained may be injected under pressure up the aforesaid pipe. In the former case the gas will soon become absorbed by the water forming dilute sulfurous acid and in either case the dilute acid solution will exert a chemical action on the roasted ore in the known manner.

Another example of the application of this invention to the zinc bisulfite process already referred to resides in the use of steam or hot gases in an injector agitator for the conversion of soluble bisulfite of zinc into the insoluble monosulfite. The steam or hot gas may be introduced at the foot of the pipe in an injector agitator and a reduced pressure may be maintained on the surface of the bisulfite of zinc solution, the result being the heating and agitation of the contents of the apparatus and the conversion of the bisulfite of zinc into the monosulfite with evolution of sulfur dioxid. Zinc or other ores may be similarly treated with other appropriate chemically active gases either free or in solution. Ores containing zinc or copper may, for example, be treated in the manner hereinbefore described with ammonia either in the hydrated or gaseous form. The soluble gas or gases or the solution thereof may be used in substitution for the mere lifting medium hitherto employed in the injector agitator or in addition thereto.

Figure 1 is a sectional view of one form of apparatus for carrying out the present process. Figs. 2, 3 and 4 are similar views of modified forms of apparatus.

Referring to Fig. 1, A is the mixer and into this leads a pipe B having a conical end $B^1$ situated within a receptacle C. Beneath the conical end $B^1$ of the pipe B is arranged a nozzle D leading from a conduit $D^1$. Above the receptacle C is a hopper E with a spiral conveyer $E^1$ for depositing the ore in the receptacle C. A supply of water F is also provided. Sulfur dioxid or sulfurous acid is pumped by means of the conduit $D^1$ into the receptacle C and the nozzle D and orifice $B^1$ acting as an injector, by which the ore and water are forced into the mixer A whence they pass out through a conduit G. The gas above the liquid in the mixer is under pressure so that the sulfur dioxid is retained by the liquid. A pipe H is arranged having one end opening above the level of the liquid in the mixer and the other end connected to a pressure gage $H^1$ whereby the pressure in the tank over the liquid is indicated. A safety valve H² is also provided on the conduit pipe H.

In the modification shown in Fig. 2 the mixer K has projecting into it a nozzle L connected to a conduit L¹ through which sulfur dioxide or sulfurous acid is pumped. Above the nozzle L¹ is a pipe M having a conical orifice M¹ and leading upward into a closed receptacle M². From the receptacle M² a number of conduits M³ radiate to the sides or near the sides of the mixer. A pressure gage H¹ and a safety valve H³ are provided at the top of the receptacle M². An outlet pipe or conduit N is provided at the bottom of the mixer; the top of the mixer is closed but it can be opened for the purpose of putting in ore and water. The nozzle L and the orifice M¹ acting as an injector cause the mixture to pass up through the conduit M and out through the conduits M³ to the sides of the mixer and by bringing the ore to the outside of the mixer the ore is thoroughly treated. In this modification the mixing is done by the injector action though the actual introduction of the ore into the mixer is not or need not be effected by this means.

Referring to Fig. 3 another form of mixer O is shown. The mixer O is provided with an outlet O¹ at the bottom passing to an outlet O² for emptying the treated material and to an outlet or conduit O³ used in the circulation system. The conduit O³ is joined to the conduit O⁴ which leads back to the top of the mixer. Entering the conduit O⁴ at the bottom as shown is a nozzle P leading from a conduit P¹. A hopper O⁵ provided with a cover is arranged at the top of the mixer for the introduction of the ore and water. Sulfur dioxide or sulfurous acid is injected through a conduit P¹ and nozzle P and by the injector action circulates the material thoroughly thereby insuring efficient treatment. At the top of the mixer a pressure gage H¹ and a safety valve H³ are provided.

Referring to Fig. 4 the mixer Q (which contains the water and ore) has a central vertical pipe R open at both ends and slightly flared at the bottom and an injector nozzle S projecting through the bottom of the mixer Q and into the bottom of the vertical pipe R is arranged to introduce the sulfur dioxide or sulfurous acid which causes the circulation of the mixture and effects the solution of the zinc from the ore.

For the purpose of washing away a mass of ore if necessary, hollow radial spraying arms T connected through central hollow castings T¹ with supply pipes may be used to direct streams of liquid on to the conical bottom of the mixer.

If a supersaturated solution of sulfur dioxid in water is employed as referred to above, this may be prepared by pumping sulfur dioxid gas into a hermetically closed vessel but it may be prepared in any other way.

The zinc may be precipitated from the solution as monosulfite preferably by the combined action of heat and vacuum. The precipitated zinc mono-sulfite is then preferably heated in a suitable furnace to obtain zinc oxid and the escaping sulfur dioxid gases may be used again in the process, after having also been brought in contact with the zinc solution coming from the extracting mixer for the purpose of heating the said solution.

What we claim as our invention and desire to secure by Letters Patent is:—

1. The method of continuously treating metalliferous ores or compounds, in a suspending liquid which consists in circulating the ore and liquid in a closed system and under pressure through a conduit of restricted capacity and into a closed receiver for retaining pressure by the introduction of a chemically active elastic fluid medium under pressure into the conduit upwardly in the direction in which the ore is circulated therethrough whereby the ore circulating through the conduit is commingled with and acted upon by the chemical agent and the chemically active medium is retained by the liquid.

2. The method of continuously treating metalliferous ores in a suspending liquid which consists in transferring the ore and liquid from a containing tank to a closed mixing chamber in which pressure is maintained, through a conduit of restricted capacity and during such transfer commingling therewith in the conduit a chemically active elastic fluid medium, whereby the ore is subjected to uniform chemical action and the chemically active medium is retained by the liquid.

3. The method of extracting zinc from its ores which consists in commingling the ore with a suspending liquid in forcing said ore and liquid through a conduit of restricted capacity and against maintained pressure by a jet of sulfurous acid whereby all portions of the ore are subjected to a uniform chemical action and in subsequently filtering the solution and precipitating the zinc.

In testimony whereof we have signed our names to this specification in the presence of subscribing witnesses.

HENRY THOMAS DURANT.
HENRY LIVINGSTONE SULMAN.
WOLDEMAR HOMMEL.

Witnesses as to Henry Thomas Durant:
CHRISTOPHER LEWELLIN HARRY,
REGINALD OWEN JAMES.

Witnesses as to Henry Livingstone Sulman and Woldemar Hommel:
H. D. JAMESON,
A. NUTTING.